June 5, 1923.

E. C. GUTHARD

TOOL HANDLE AND THE LIKE

Filed Oct. 25, 1920

1,457,570

WITNESSES:
P. Gathmann

INVENTOR
Edgar C. Guthard
BY Cromwell, Greist & Warden
HIS ATTORNEYS

Patented June 5, 1923.

1,457,570

UNITED STATES PATENT OFFICE.

EDGAR C. GUTHARD, OF CHICAGO, ILLINOIS.

TOOL HANDLE AND THE LIKE.

Application filed October 25, 1920. Serial No. 419,562.

*To all whom it may concern:*

Be it known that I, EDGAR C. GUTHARD, a citizen of the United States, residing at Chicago, in the county of Cook and State of Illinois, have invented certain new and useful Improvements in Tool Handles and the like, of which the following is a specification.

This invention relates generally to hand operated tools, and particularly to improvements in handles or handle mountings especially applicable to hand tools designed to be operated by rotary or oscillatory movement. The general purpose of the invention is the provision of a handle construction which is designed to permit demounting of projecting portions, and be effective to sustain heavy stresses applied in the operation of the tool without danger of injury to the instrument itself or to the operator.

A more particular object of the invention is the provision of a handle mounting which may be constructed very economically as an integral part of the tool, and which lends itself to a great variety of applications and uses.

Another object of the invention is the provision of a handle mounting which will accommodate a great variety of adjustments, both in preparation for the use of the tool, and in actual operation of the tool, so that it may be employed in locations and in uses where the working space is limited.

Another object of the invention is the provision of a handle construction wherein operated parts are susceptible of adjustment and demounting, but in which they are securely retained against accidental displacement or loss from their mountings.

A still further object of the invention is the provision of a handle mounting particularly adapted to use in tools employing a hollow shank or barrel.

Other and further objects of the invention will be pointed out hereinafter, will be indicated in the appended claims, or will be obvious from the accompanying drawing forming a part of this specification.

Figure 1:
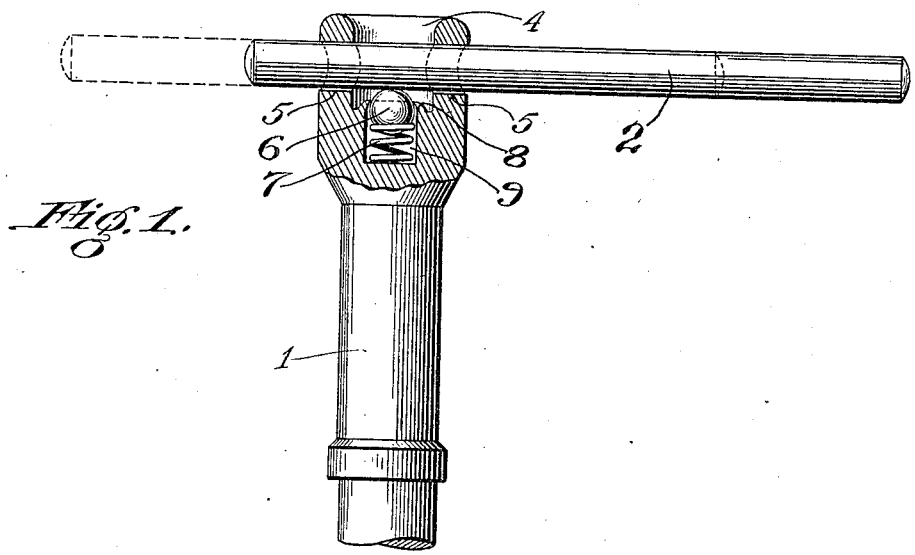
Figure 2:
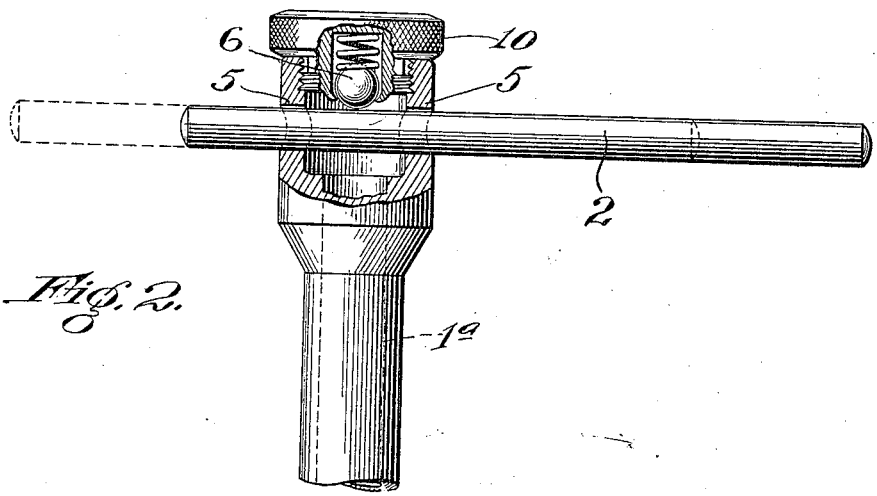

In said drawing,

Fig. 1 represents a fragmentary elevational view of a tool handle portion, partly in section; and Fig. 2 represents a similar view of a modified form.

While I show in this disclosure two preferred embodiments of the invention, it is to be understood that they are presented for the purpose of illustrating the essential features and organization of elements constituting the invention, and are not to be construed as limitations restricting the invention as claimed, short of its true or most comprehensive scope.

In the illustrative showing, the reference character 1 designates generally the shank of a tool designed for rotary movement, such as a wrench, bit-stock, auger, ground anchor of the auger type or the like, it being understood that the lower extremity of the shank is provided with the intended socket, workhead or the like. As illustrated in Fig. 1, the upper or handle extremity of the shank forms a mounting for a removable handle portion 2. Said mounting is preferably in the form of a ring or hollow embossment 4 presenting oppositely disposed portions positioned preferably on opposite sides of the axis of the shank. These oppositely disposed portions are transversely apertured to provide handle seats 5 which preferably are in alignment on a diameter of the mounting, which handle seats are of proper shape and size to receive the demountable handle portion 2 slidably, so that the same may be inserted through both thereof in either lateral direction, and moved therein to any desired position. Between the seats 5, the mounting provides a place of attachment for a detent member here shown as comprising a ball 6 held under the pressure of a spring 7 against a stop 8. This structure may be formed by boring a longitudinal channel 9 in the shank, seating the spring and ball therein, and then upsetting the material around the mouth of the channel so as to engage the ball above its middle. The relationship of these parts to the handle seats 5 is such that the ball extends into the space traversed by the removable handle portion 2 in its movement from one seat to the other, and the spring 7 permits the ball to be pressed down into the seat by the handle upon its introduction. To facilitate this the ends of the handle may be rounded somewhat, as shown. When the handle is in place the compression in the spring 7 forces the ball into close engagement with the surface of the handle, so as to be effective to hold it frictionally against the opposite sides of the seats 5 and prevent its sliding out of the seat under the influence of gravity or from handling of the tool incident to its use. The arrangement, however, permits adjustment of the handle to any longitudinal position in the seats, so that it may be placed midway to form a two handed lever whereby the tool may be rotated, or may be projected for substantially its entire length at one side of the shank to provide increased leverage, or may be adjusted to any suitable length to accommodate the tool to the work space afforded by the place where it is used. Moreover, during the operation of the tool, the adjustable handle 2 may be slid from one side to the other after partial rotation of the shank 1 to permit its being engaged by the hand in a position where space permits, when a complete rotation of the tool with the handle in a given adjustment is limited. When the tool is not in use, the removable handle may be completely withdrawn so that it may be packed in parallel relationship with the tool shank, thus conserving space. It will be observed that in all uses of the tool the detent means is completely housed and protected from accidental injury or removal.

In Fig. 2 I have shown the manner in which the invention may be applied to a tool having a hollow shank or barrel. In said figure the reference character 1ª designates the longitudinal channel or bore of a hollow tool shank, which may be intentionally formed in that fashion for the feeding of lubricant to the work-head, the accommodation of detachable tool parts, the accommodation of the removable handle portion 2, or the like. The handle seats 5 in this form are provided by the annular enlargement or cup-like head of the shank provided with the oppositely disposed handle-receiving openings. Inasmuch as it is desirable to keep the barrel open in such a tool, the detent means cannot be seated as in Fig. 1, but is seated in a removable cap 10 arranged for screw thread or other detachable engagement with the shank head so that, when in place thereon, the ball 6 will lie in the proper relationship to the handle seats, being retained between its stop and the compressible spring. Said cap 10 thus functions as a closure for the barrel of the tool, both when the removable handle 2 is in place, and when it is removed and, in the first mentioned condition also constitutes part of the handle retaining means. In such an embodiment all of the several adjustments of the removable handle portion 2 above described are permitted without interfering with the intended functions of the hollow shank.

The foregoing construction is very economical, very strong, and effective to retain the movable handle portion against accidental displacement while permitting its intentional adjustment to a great range of positions.

I claim:

1. In a tool, the combination of a tubular shank member, said shank member being provided adjacent its end with transverse apertures affording a handle seat, a separate handle insertable either into the bore of the shank or into said seat, and a closure member demountably secured to the end of the shank and adapted to maintain the handle in either the bore thereof or in said seat, said closure including a spring-pressed detent arranged for engagement with the handle when the latter is in the seat.

2. In a tool, the combination of a hollow shank having a terminal part affording opposite wall portions, said opposite wall portions being provided with apertures in alignment, a separate handle portion insertable longitudinally through said apertures, a cap detachably mounted on the terminal part to form a closure therefor, and a detent mounted on said cap and operatively engaging the handle to detain it in the apertures.

3. In a tool, the combination of a tubular shank member, a closure member arranged for detachable mounting at one end of said shank member to close the same, said shank member being provided with opposite transversely extending apertures adjacent said end, a handle insertable in said apertures and movable therein transversely of the shank, and a spring pressed detent mounted on said closure member and adapted for cooperation with the handle when the closure and the handle are mounted on the shank, said detent being removable from cooperation with the handle by demounting the closure member.

In testimony whereof I have hereunto subscribed my name in the presence of two subscribing witnesses.

EDGAR C. GUTHARD.

Witnesses:
C. S. BUTLER,
FRANCES K. GILLESPIE.